(12) United States Patent
Crawford

(10) Patent No.: US 8,006,101 B2
(45) Date of Patent: Aug. 23, 2011

(54) RADIO TRANSCEIVER OR OTHER ENCRYPTION DEVICE HAVING SECURE TAMPER-DETECTION MODULE

(75) Inventor: Nathan J. Crawford, Palatine, IL (US)

(73) Assignee: General Instrument Corporation, Horsham, PA (US)

( * ) Notice: Subject to any disclaimer, the term of this patent is extended or adjusted under 35 U.S.C. 154(b) by 554 days.

(21) Appl. No.: 12/142,932

(22) Filed: Jun. 20, 2008

(65) Prior Publication Data

US 2010/0017621 A1 Jan. 21, 2010

(51) Int. Cl.
*H04L 9/32* (2006.01)
*H04L 9/00* (2006.01)

(52) U.S. Cl. ........... 713/189; 713/193; 713/194; 380/46

(58) Field of Classification Search ........... 380/273, 380/277, 44, 46; 713/189, 192–194
See application file for complete search history.

(56) References Cited

U.S. PATENT DOCUMENTS

| | | |
|---|---|---|
| 4,811,288 A | 3/1989 | Kleijne et al. |
| 5,363,447 A * | 11/1994 | Rager et al. .......... 380/273 |
| 5,790,670 A | 8/1998 | Bramlett |
| 5,858,500 A | 1/1999 | MacPherson |
| 5,861,662 A | 1/1999 | Candelore |
| 6,289,455 B1 * | 9/2001 | Kocher et al. .......... 713/194 |
| 6,512,454 B2 | 1/2003 | Miglioli et al. |
| 2002/0018571 A1 | 2/2002 | Anderson et al. |
| 2004/0066274 A1 | 4/2004 | Bailey |
| 2005/0105366 A1 | 5/2005 | Pedlow, Jr. |
| 2005/0278787 A1 | 12/2005 | Naslund et al. |
| 2006/0101288 A1 | 5/2006 | Smeets et al. |
| 2006/0102458 A1 | 5/2006 | Kim et al. |
| 2006/0288407 A1 | 12/2006 | Naslund et al. |

* cited by examiner

*Primary Examiner* — Hosuk Song
(74) *Attorney, Agent, or Firm* — Larry T. Cullen

(57) ABSTRACT

An encryption device includes a system processor having a first key for encrypting information. The system processor periodically generates random data strings that are also encrypted using the first key. The encryption device also includes a first output for communicating the encrypted information to an external location and a tamper detection module for receiving on a periodic basis the random data strings generated by the system processor. The tamper detection module includes a second key that is the same as the first key, an encryption engine for encrypting the random data strings using the second key, and a second output for communicating the encrypted data strings to the system processor. The tamper detection module is configured to alter the second key upon detection of a tampering event so that the second key is different from the first key.

19 Claims, 3 Drawing Sheets

RADIO TRANSCEIVER OR OTHER ENCRYPTION DEVICE HAVING SECURE TAMPER-DETECTION MODULE

FIELD OF THE INVENTION

The present invention relates generally to the protection of electronic encryption devices from tampering and, more specifically, to electronic encryption devices that retain a permanent record of tampering even if they are rekeyed.

BACKGROUND OF THE INVENTION

Secure communication systems are well known. Police and public safety personnel, for example, often require secure voice and/or data communications between mobile transmitters and receivers, such as in-car mobile or hand-held portable radios (mobiles) as well as fixed transmitters and receivers, such as a central dispatch station. The communication paths between the mobiles and the fixed end are typically wireless links, such as radio frequency (RF) channels. The communication paths between fixed transmitters and receivers are typically wireline links, such as land-based phone lines. Secure communication is made possible by designated transmitters and receivers (hereinafter "encryption devices") sharing an encryption key that uniquely specifies an encryption algorithm for the communication. Only encryption devices having identical keys are capable of intelligibly reproducing the communication.

Encryption keys and other sensitive data are usually stored in memory components in the encryption device and need to be protected carefully from unwanted inspection or tampering. Software control and protection methods may be not enough to stop an experienced person from bypassing these protections and tampering with the device, e.g. by direct interrogation of memory components such as integrated circuit memory. A possible protection from the above physical attacks is to provide some kind of detecting means which detects an attempted intrusion within a protected sensitive area and reacts by giving an alarm or even by destroying any sensitive information (e.g., an encryption key) to avoid the loss of secrecy.

If an encryption key is erased upon unwanted inspection or tampering, the encryption device may be disabled. However, an attacker with access to a key loader could reload the keys. The process of reloading encryption keys into an encryption device is called rekeying. For instance, in a law enforcement context, the key loader is often a priori configured by a security officer and then placed in the hands of a field operator to carry out the rekeying process. The field operator is then able to download the key into the memory of the encryption device.

Once the encryption device has been rekeyed, no permanent record remains of the tampering. Without a permanent record in the encryption device itself, the encryption device cannot report the tampering event to an appropriate party or take other actions to thwart the intruder, such as causing itself to permanently cease operation.

SUMMARY OF THE INVENTION

In accordance with the present invention, an encryption device is provided. The device includes a system processor having a first key for encrypting information. The system processor periodically generates random data strings that are also encrypted using the first key. The encryption device also includes a first output for communicating the encrypted information to an external location and a tamper detection module for receiving on a periodic basis the random data strings generated by the system processor. The tamper detection module includes a second key that is the same as the first key, an encryption engine for encrypting the random data strings using the second key, and a second output for communicating the encrypted data strings to the system processor. The tamper detection module is configured to alter the second key upon detection of a tampering event so that the second key is different from the first key.

In accordance with one aspect of the invention, the periodic basis on which the random data strings are received by the tamper detection module may range from about 1000 times/second to once every five minutes.

In accordance with another aspect of the invention, the tamper detection module may further include a tamper detector for detecting tampering events.

In accordance with another aspect of the invention, the tamper detection module may further include a key alteration unit that permanently alters at least one bit of the first key upon detection of a tamper event by the tamper detector.

In accordance with another aspect of the invention, the tamper detection module may further include a storage unit in which the second key is located. The storage unit may have an interface accessible to only the tamper detection unit and the encryption engine.

In accordance with another aspect of the invention, the second key may be configured to be non-user-rekeyable.

In accordance with another aspect of the invention, the system processor may include a comparator for comparing encrypted data streams it encrypts using the first key with the encrypted data streams received from the tamper detection module.

In accordance with another aspect of the invention, the system processor may be configured to perform a predetermined action if the comparator determines that one of the encrypted data streams encrypted using the first key is different from a corresponding one of the encrypted data streams received from the tamper detection module.

In accordance with another aspect of the invention, the predetermined action may cause the encryption device to be inoperable.

In accordance with another aspect of the invention, the predetermined action may cause a third party to be notified that a tamper event has occurred.

In accordance with another aspect of the invention, a method is provided for detecting if an intruder tampers with an encryption device such as a mobile phone or a radio. The encryption device generates a random data string. The data string is encrypted using a first encryption key that is stored in the encryption device such that it is user-rekeyable. In addition, the data string is also encrypted using a second encryption key that is not user-rekeyable and which is initially the same as the first key. If a tamper event is detected, the second key is altered. The data string encrypted by the first key is compared with the same data string encrypted by the second key. If the two encrypted data strings are the same, another random string is generated. Alternatively, if the two encrypted data strings are different, the encryption device responds by performing a predetermined action (e.g., disabling the device, reporting the tampering event to a higher level of authority or other third party).

DETAILED DESCRIPTION

Figure 1:
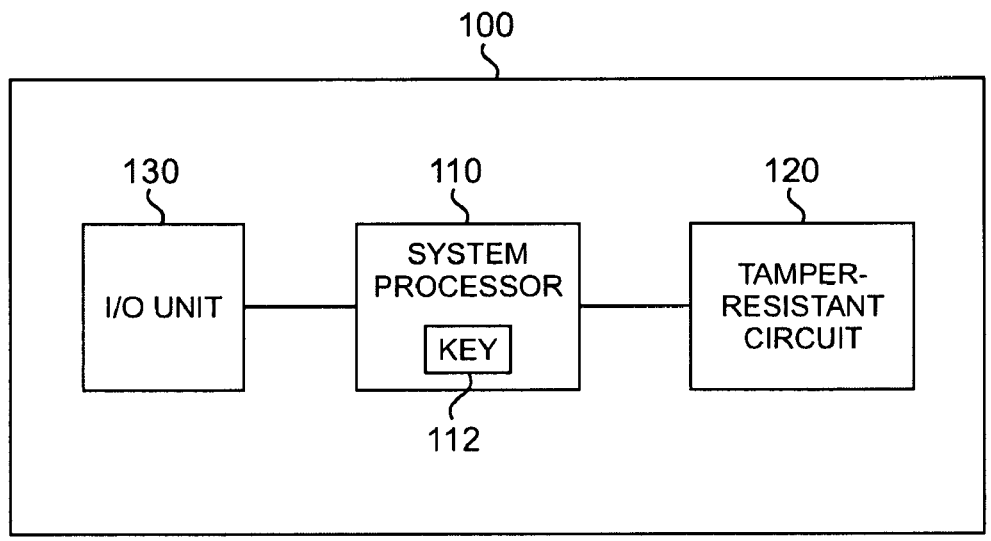
FIG. 1 is a schematic block diagram of a general encryption device provided with a tamper-resistant electronic circuit.

FIG. 1 is a schematic block diagram of a general encryption device provided with a tamper-resistant electronic circuit. The encryption device 100 includes a tamper-resistant electronic circuit 120, and a system processor 110 whose functionality depends on the nature of the particular device and its overall function. While the system processor 110 is depicted for simplicity as a single element, the system processor 110 more generally may encompass any combination of one or more individual processors, memory units and the like.

The encryption device 100 typically also includes a general input/output unit 130 for transferring data to/from the device under the control of the system processor 110. Of course, the encryption device 100 may be equipped with additional units, e.g. for performing various types of data processing, which also depends on the particular function the encryption device 100 is to perform. For instance, the encryption device 100 may be a user terminal such as a mobile phone or radio, a general-purpose computer such as a PC or a dedicated-purpose computer such as a gaming device or a set-top terminal. Other examples of encryption device 100 include cameras, audio devices, network servers, security gateways, firewalls, base stations and so forth.

The system processor 110 includes a cryptographic key 112 to encrypt data before it is transferred to input/output device 130. To prevent an unauthorized party from accessing the key 112, the tamper-resistant circuit 120 is conventionally configured so that upon detecting unauthorized tampering (e.g., removal of a cover, etc), the key 112 is erased, thereby preventing the encryption device 100 from functioning.

One problem with this key erasure approach is that the encryption device 100 can still be rekeyed by a party in possession of a suitable key delivery device. For instance, this party, who is presumably an authorized party, may be acting in cooperation with an intruder or other unauthorized party. The intruder may wish to tamper with the encrypting device in any of a number of ways. For instance, in the case of a secure communication system employed by police or other law enforcement personnel, the intruder may wish to incorporate an eavesdropping device into the encryption device. After the intruder tampers with the encryption device 100 the authorized party with whom the intruder is cooperating can rekey the device 100 so that it is once again operational, leaving no indication or record that a tampering event has occurred. That is, the rekeying process destroys any evidence that the encryption device has been tampered with. If such evidence were to remain available, the system processor 110 could respond by permanently disabling the device, reporting the tampering event to a higher level of authority, or by taking any other action deemed appropriate for the particular encryption device. Accordingly, since the act of simply erasing the key does not leave a permanent record of tampering or permanently disable the device, unauthorized tampering may still readily occur without detection.

A significantly higher degree of security against unauthorized tampering may be achieved if a permanent recording of tampering were available or if the encryption device 100 were to be permanently disabled after tampering is detected. In this context an encryption device is permanently disabled if it can only be returned to an operational state by returning it to the manufacturer. That is, an encryption device is permanently disabled if an authorized user of the device, even a user who is in possession of any necessary encryption keys, cannot return the device to its operational state. Likewise, a permanent record of tampering is available if the evidence of tampering can only destroyed by the manufacturer and not by an authorized user.

Figure 2:
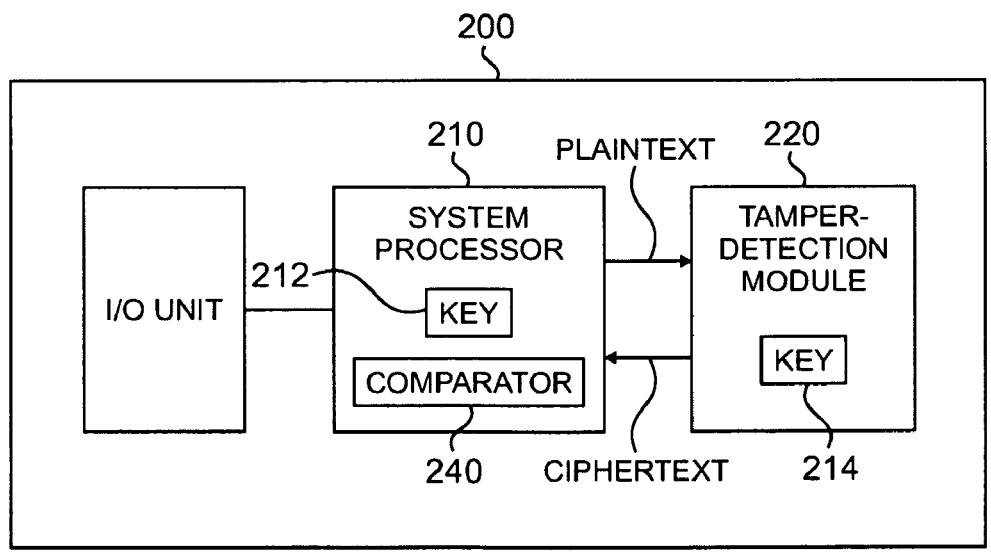
FIG. 2 shows an example of an encryption device with a tamper-resistant module that maintains a permanent record of tampering.

FIG. 2 shows an encryption device 200 that maintains a permanent record of tampering. This is accomplished by providing a tamper detection module 220 that itself maintains a copy of the encryption key that is employed by the system processor 210. In normal operation (i.e, when no tampering has occurred), system processor 210 generates a random string of data or plaintext and requests the tamper detection module 220 to encrypt it using its encryption key 214. The tamper detection module 220 encrypts the data string and returns the encrypted data string or ciphertext to the system processor 210. The system processor 210 also encrypts the data string it has generated using its own key 212. Since the keys in both the system processor 210 and the tamper detection module 220 are the same, when the system processor 210 uses comparator 240 to compare the encrypted data string from the tamper detection module 220 with the data string it itself has encrypted it will find that the two encrypted data strings are the same.

On the other hand, if the tamper detection module 220 detects tampering, it will permanently alter its key 214. That is, as a result of tampering, the key 212 employed by the system processor 210 will be different from the key 214 employed by the tamper detection module 220. As a consequence, when the system processor 210 next sends a random data string to the tamper detection module 220, the encrypted data string the system processor 210 receives in return will be different from its own encrypted version of the same random data string. In this way the system processor 210 becomes aware that a tamper event has occurred. Since the key 214 maintained by the tamper detection module 220 has been permanently altered, a permanent record of the tampering event is maintained by the encryption device 200.

Although the key maintained by the tamper detection module 220 has been permanently altered, the encryption device can continue to operate since the key maintained by the system processor is intact. However, since the system processor has a permanent record of tampering, it can take appropriate action. For instance, as previously mentioned, it can respond by permanently disabling the device, reporting the tampering event to a higher level of authority or other third party, or by taking any other action deemed appropriate for the particular encryption device.

Another important advantage of the system and techniques described herein is that because in some implementations the encryption device can remain operational after tampering, the intruder does not know when he has triggered the tamper detection module. Moreover, the intruder will not be able to determine if the module has been triggered even if he were to use a logic analyzer to examiner the data bits being transmitted between the system processor and the tamper detection module. This is because in both the triggered and untriggered state, the intruder will simply see a random string of bits being periodically sent from the system processor to the tamper detection module and a different random string of bits being sent from the tamper detection module back to the system processor.

Since the intruder does not know if the tamper detection module has been triggered, it becomes more difficult for him to circumvent it. For instance, an intruder will sometimes acquire two encryption devices and examine the first one to gain an understanding of how its tamper detection module is triggered. In particular, the intruder may cause the tamper detection module to be triggered to determine the action that caused it to be triggered. The intruder may then tamper with the second encryption device and avoid triggering the tamper detection module using the knowledge gained from the first encryption device. In the present case, if the encryption device remains operational, the intruder will not know precisely what caused the tamper detection module to be triggered and thus will not know how to avoid triggering it.

Figure 3:
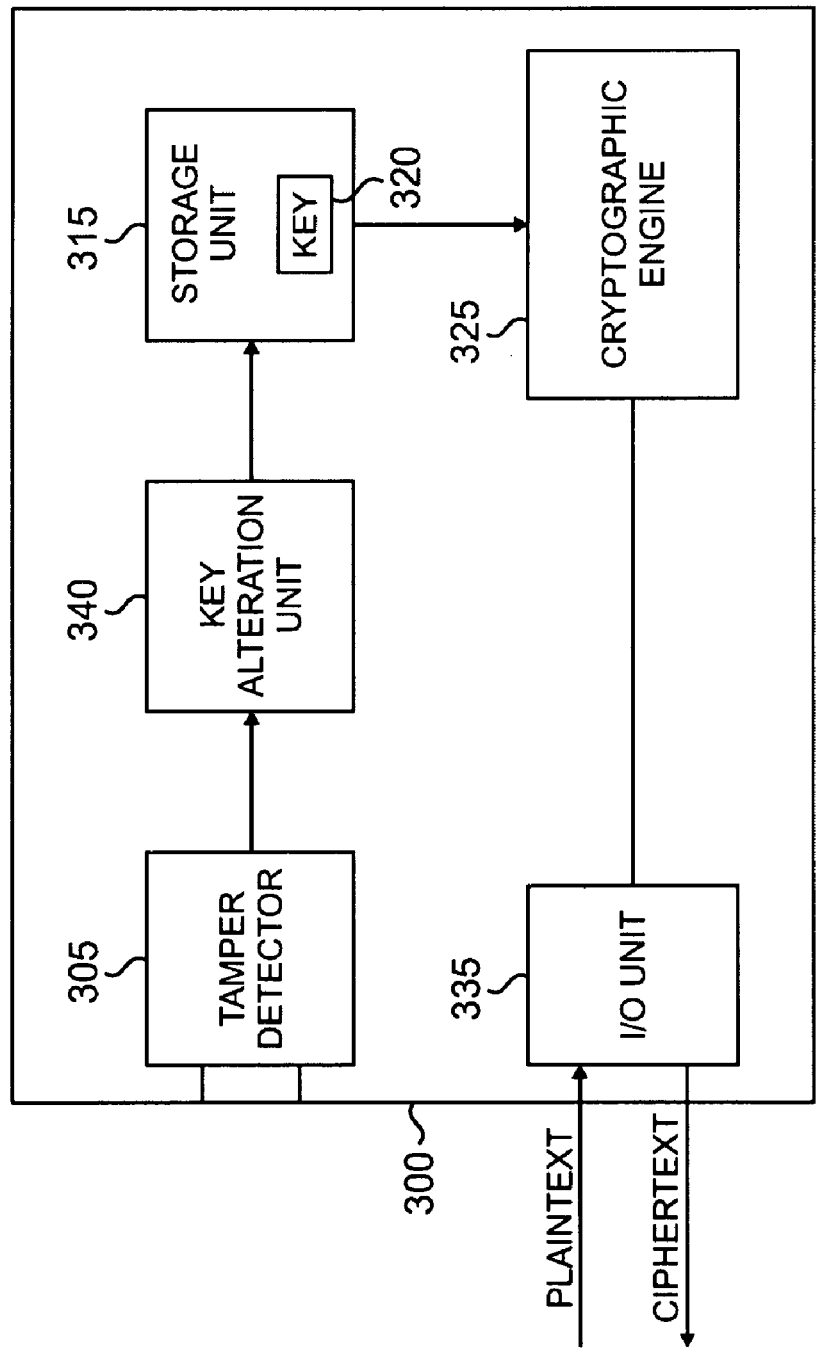
FIG. 3 shows one example of a tamper detection module that may be employed in the encryption device of FIG. 2.

FIG. 3 shows one example of a tamper detection module 300 that may be employed in the encryption device 200 of FIG. 2. The tamper detection module 300 may be an integrated circuit (IC), a smart card or any other tamper-resistant electronic circuit, and includes an input/output unit 335 for transferring data to and from the system processor, a storage unit 315 for storing an encryption key 320, an engine or unit 325 for cryptographic processing and a tamper detector 305 for detecting when a tampering event has occurred. The encryption key 320 is not accessible over an external circuit interface and hence not available outside the tamper detection module 300. The cryptographic engine 325 is connected to the storage unit 315 and configured for performing cryptographic processing at least partly in response to the encryption key 320 in order to generate an encrypted data string from the random data string provided to the cryptographic engine 325 by the system processor 110.

If the tamper detector 305 determines that an intruder is tampering with the encryption device the detector 305 will cause the key 320 to be altered so that it is no longer the same as the key located in the system processor. For this purpose, in one implementation, the tamper detection module 300 includes a key alteration unit 340, which operates under the direction of the tamper detector 305.

The tamper detector 305 may be any type of arrangement that can detect if the encryption device is undergoing a physical attack or intrusion. For instance, in one implementation the tamper detector 305 is formed from a metallic plate that covers the internal circuitry and other components, including the memory in which the encryption key is stored. The tamper detector 305 also includes circuitry that instructs the key alteration unit 340 to alter the key 320 stored in the storage unit 315 when an attempt is made to remove the protective cover. In particular, the protective cover may be a metallic cover that has a top and a bottom side which are secured together by a screw or other fastener. The screw functions to cause a switch arm to depress a switch button when the mechanism is in its assembled state. When the screw is rotated, a circuit is activated (by opening of the button), the attempt to open the cover is detected and the key alteration unit 340 is enabled.

In another implementation the tamper detector 305 includes a conductive strip that lines one or more interior portions of a non-conductive housing. Interrupting or shorting the conductive strip, such as may occur when an intruder attempts to gain access to the interior of the housing, enables the key alteration unit 340, thereby causing the encryption key to be altered.

In yet another implementation the storage unit 315 in which the key 320 is located is incorporated in an integrated circuit (IC), which is fabricated as a monolithic device that is encapsulated by a compound material. One way to tamper with such an IC is to decapsulate the IC so that it can be probed it in order to monitor electrical signals in the active components of the IC. In this implementation the tamper detector 305 may include one or more conductive layers that overlay the IC or the secure portion thereof. The conductive layers shield at least the secure portion of the IC from inspection and carry a signal that is provided to a component on the IC. Removal of the conductive layers by an intruder causes loss of power to the component, thus indicating that an attempt is being made to tamper with the IC.

In yet another implementation the tamper detector 305 may include a photodetector located within the housing of the encryption device. If the housing is opened to thereby allow in ambient light, the photodetector will sense an increase in light and in response generate a signal that enables the key alteration unit 340, which in turn causes the encryption key 320 in the storage unit 315 to be altered.

In some cases tamper detection module 300 may be powered by its own internal battery so that it remains active even when the main power to the encryption device is off. As a result the tamper detection module cannot be disabled by unplugging or otherwise disconnecting the encryption device from its main power supply.

As previously noted, in some cases the encryption key 320 should be of a type such that once it is altered, it cannot be unaltered. For instance, the key 320 may be implemented with one or more fuses or anti-fuses. A "fuse" (or an emulation of such) involves the destructive removal of an internal interconnection to permanently change a bit in key from a manufactured default state of logic "1" (ONE) to logic "0" (ZERO). Once performed, this transition can never be reversed. An "anti-fuse," however, has all bits programmed to ZERO by default and the transition is to ONE. If key 320 is implemented using a fuse or ant-fuse, key alteration unit 340 changes one or more of the bits in the key 320 from their original logic ONE or logic ZERO state to the opposite state.

In another example encryption key 320 may be stored in a programmable memory such as a programmable read-only memory (PROM). Since PROMs are typically programmed by clearing bits, the key alteration unit 340 will modify selected bits not cleared in the original programming operation, resulting in a different key from the original.

Advantageously, once a tamper event has been detected and the key 214 or 320 in the tamper detection module 220 or 300 is altered, the encryption device 200 will need to be returned to the manufacturer to clear the event. This is necessary because only a party who knows the key that is encoded in both the system processor and the tamper detection module can create a compatible tamper detection module to replace the original one. Merely replacing the original tamper detection module with a new one is not sufficient; it must include an encryption key that matches the one in the system processor.

Figure 4:
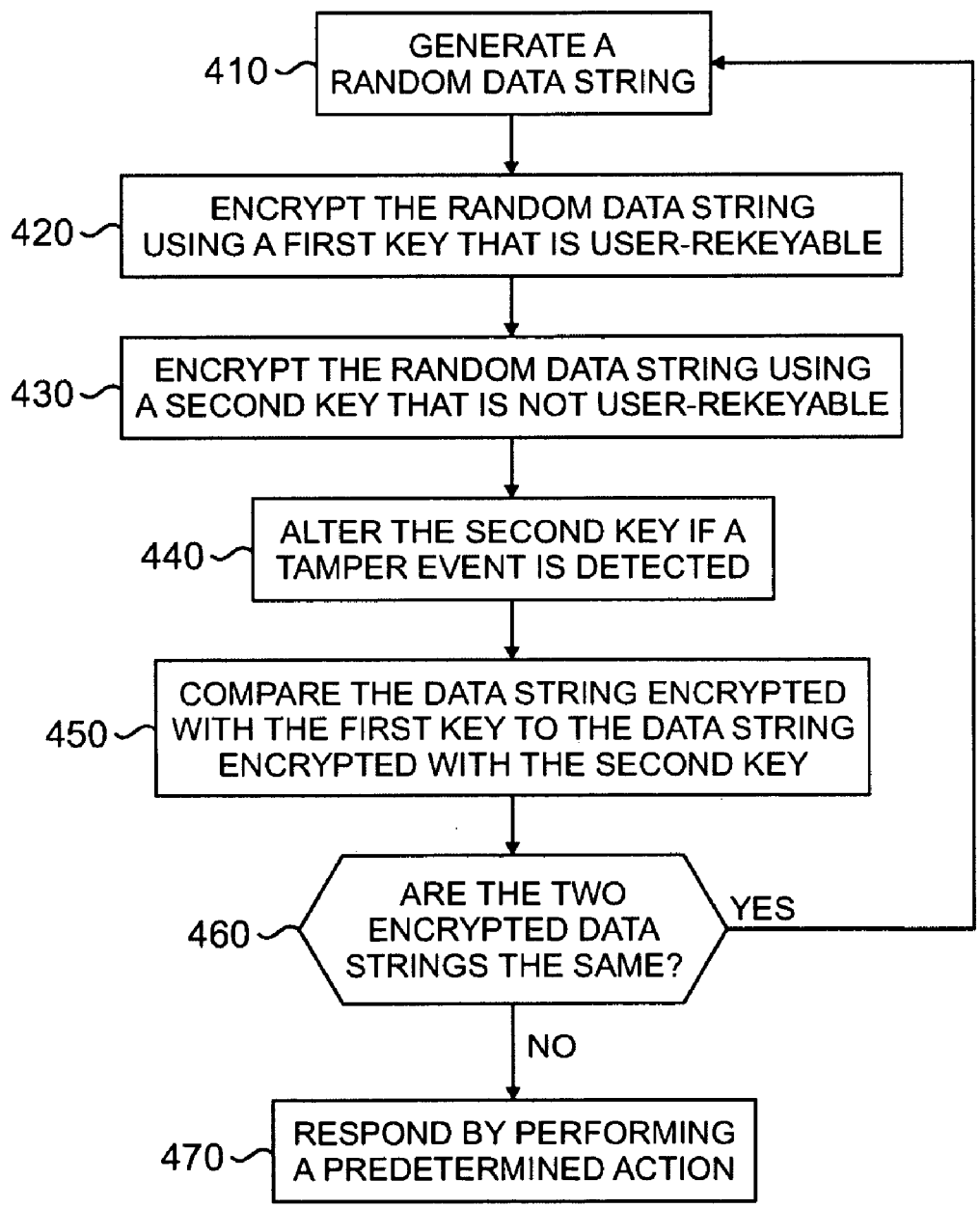
FIG. 4 is a flowchart showing one example of a method for detecting when an intruder tampers with an encryption device such as a mobile phone or a radio.

FIG. 4 is a flowchart showing one example of a method for detecting if an intruder tampers with an encryption device such as a mobile phone or a radio. The encryption device generates a random data string in step 410. The data string is encrypted in step 420 using a first encryption key that is stored in the encryption device such that it is user-rekeyable. In addition, in step 430, the data string is also encrypted using a second encryption key that is not user-rekeyable and which is initially the same as the first key. If a tamper event is detected, the second key is altered in step 440. In step 450 the data string encrypted by the first key is compared with the same data string encrypted by the second key. If the two encrypted data strings are the same, then at decision step 460 the process returns to step 420 where another random string is generated. Alternatively, if the two encrypted data strings are different, then at decision step 460 the process continues to step 470 in which the encryption device responds by performing a predetermined action (e.g., disabling the device, reporting the tampering event to a higher level of authority or other third party).

The processes described above, including but not limited to those presented in connection with FIG. 4 may be implemented in general, multi-purpose or single purpose processors. Such a processor will execute instructions, either at the assembly, compiled or machine-level, to perform that process. Those instructions can be written by one of ordinary skill in the art following the description presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

An encryption device has been described that maintains a permanent record of tampering without necessarily notifying the intruder when the tamper detector in the device has been triggered, thereby making it more difficult for the intruder to circumvent the tamper detector. Once the tamper detector is triggered the encryption device can take any appropriate action such as disabling itself or notifying a third party of the tamper event. In either case the encryption device cannot be simply rekeyed to make it operational. Rather, the device needs to be returned to the manufacturer in order to be reset.

The invention claimed is:

1. An encryption device, comprising:
a system processor that includes a first key for encrypting information and for periodically generating random data strings that are also encrypted using the first key;
a first output for communicating the encrypted information to an external location;
a tamper detection module for receiving on a periodic basis the random data strings generated by the system processor, wherein the tamper detection module includes:
a second key that is the same as the first key;
an encryption engine for encrypting the random data strings using the second key;
a second output for communicating the encrypted data strings to the system processor; and
wherein the tamper detection module is configured to alter the second key upon detection of a tampering event so that the second key is different from the first key.

2. The encryption device of claim 1 wherein the periodic basis on which the random data strings are received by the tamper detection module ranges from about 1000 times/second to once every five minutes.

3. The encryption device of claim 1 wherein the tamper detection module further includes a tamper detector for detecting tampering events.

4. The encryption device of claim 3 wherein the tamper detection module further includes a key alteration unit that permanently alters at least one bit of the first key upon detection of a tamper event by the tamper detector.

5. The encryption device of claim 1 wherein the tamper detection module further includes a storage unit in which the second key is located, the storage unit having an interface accessible to only the tamper detection unit and the encryption engine.

6. The encryption device of claim 1 wherein the second key is configured to be non-user-rekeyable.

7. The encryption device of claim 1 wherein the system processor includes a comparator for comparing encrypted data streams it encrypts using the first key with the encrypted data streams received from the tamper detection module.

8. The encryption device of claim 7 wherein the system processor is configured to perform a predetermined action if the comparator determines that one of the encrypted data streams encrypted using the first key is different from a corresponding one of the encrypted data streams received from the tamper detection module.

9. The encryption device of claim 8 wherein the predetermined action causes the encryption device to be inoperable.

10. The encryption device of claim 8 wherein the predetermined action causes a third party to be notified that a tamper event has occurred.

11. At least one non-transitory computer-readable medium encoded with instructions which, when executed by a processor, performs a method including:
periodically generating a random data string;
encrypting each of the data strings using a first encryption key that is user-rekeyable;
encrypting each of the data strigs using a second encryption key that is not user-rekeyable and which is initially the same as the first key;
altering the second key if a tamper event is detected;
comparing each of the data strings encrypted by the first key with the same data string encrypted by the second key; and
responding by performing a predetermined action if one of the data strings encrypted by the first key is different from the same data string encrypted by the second key.

12. The non-transitory computer-readable medium of claim 11 wherein the predetermined action includes disabling the device.

13. The non-transitory computer-readable medium of claim 11 wherein the predetermined action includes reporting the tampering event to a third party.

14. The non-transitory computer-readable medium of claim 11 further comprising transferring the random data string from a processing module in which the first key is located to a tamper detection module in which the second key is located.

15. The non-transitory computer-readable medium of claim 14 further comprising transferring the data string encrypted by the second key to the processing module for performing the comparison therein.

16. The non-transitory computer-readable medium of claim 14 further comprising detecting a tamper event when a housing is opened in which the processing module and the tamper detection module are located.

17. The non-transitory computer-readable medium of claim 11 wherein the random data strings are periodically generated within a range of about 1000 times/second to once every five minutes.

18. The non-transitory computer-readable medium of claim 11 wherein comparisons of encrypted data strings are performed within a range of about 1000 times/second to once every five minutes.

19. The non-transitory computer-readable medium of claim 11 wherein the second key is permanently altered if a tamper event is detected.

* * * * *